(12) United States Patent
Adler et al.

(10) Patent No.: US 8,071,197 B2
(45) Date of Patent: Dec. 6, 2011

(54) ASSEMBLED HONEYCOMB

(75) Inventors: Joerg Adler, Meissen (DE);
 Hans-Juergen Richter, Dresden (DE);
 Reinhard Lenk, Dresden (DE); Uwe Petasch, Panschwitz-Kuckau (DE);
 Claus Holdschuh, Hoechstadt (DE);
 Thomas Rahn, Ebelsbach (DE);
 Hans-Joerg Rembor, Nuremberg (DE)

(73) Assignees: Fraunhofer-Gesellschaft zur Foerderung der Angewandten Forschung E.V., Munich (DE);
 Cleandieselceramics GmbH, Dresden (DE)

( * ) Notice: Subject to any disclaimer, the term of this patent is extended or adjusted under 35 U.S.C. 154(b) by 1163 days.

(21) Appl. No.: 11/829,795

(22) Filed: Jul. 27, 2007

(65) Prior Publication Data
 US 2008/0160250 A1 Jul. 3, 2008

(30) Foreign Application Priority Data
 Jul. 28, 2006 (DE) .......... 10 2006 036 498

(51) Int. Cl.
 *B32B 3/12* (2006.01)
 *B01D 39/06* (2006.01)
 *B01D 50/00* (2006.01)
 *B01D 45/00* (2006.01)

(52) U.S. Cl. .......... 428/116; 55/523; 422/180; 422/181; 422/182; 422/183

(58) Field of Classification Search ............... 428/116; 55/523; 422/180, 181, 182, 183
 See application file for complete search history.

(56) References Cited

U.S. PATENT DOCUMENTS

| 4,304,585 | A | * | 12/1981 | Oda et al. ............... 65/43 |
| 4,329,162 | A |   | 5/1982  | Pitcher, Jr. |
| 4,335,783 | A | * | 6/1982  | McBrayer et al. ......... 165/8 |
| 4,642,210 | A | * | 2/1987  | Ogawa et al. ............. 264/631 |
| 6,126,833 | A | * | 10/2000 | Stobbe et al. ............. 210/650 |
| 6,669,751 | B1 | * | 12/2003 | Ohno et al. ............... 55/523 |
| 6,720,060 | B1 | * | 4/2004  | Swars ..................... 428/116 |
| 7,396,576 | B2 | * | 7/2008  | Masukawa et al. ........ 428/116 |
| 7,789,929 | B2 | * | 9/2010  | Riley ..................... 55/522 |
| 7,897,238 | B2 | * | 3/2011  | Ohno et al. .............. 428/116 |
| 2009/0239028 | A1 | * | 9/2009 | Ohno et al. ............. 428/116 |

FOREIGN PATENT DOCUMENTS

| EP | 0 816 065 | 1/1998 |
| EP | 1 142 619 | 10/2001 |
| EP | 1 291 061 | 3/2003 |
| EP | 1 508 356 | 2/2005 |
| WO | 2005/071234 | 8/2005 |
| WO | 2005/084782 | 9/2005 |

* cited by examiner

*Primary Examiner* — Gordon R Baldwin
(74) *Attorney, Agent, or Firm* — Greenblum & Bernstein, P.L.C.

(57) ABSTRACT

An assembled honeycomb structure includes at least two prismatic honeycomb segments. An outer cross section of each of the at least two prismatic honeycomb segments perpendicular to a flow direction in an interior of the assembled honeycomb structure is a quadrangle with included angles of one of: (i) about 60° and about 120°, or (ii) about 60°, about 90° and about 120°.

44 Claims, 7 Drawing Sheets

Adhesive

ASSEMBLED HONEYCOMB

CROSS-REFERENCE TO RELATED APPLICATIONS

The present application claims priority under 35 U.S.C. §119 of German Patent Application No. 10 2006 036 498.8, filed Jul. 28, 2006, the disclosure of which is hereby expressly incorporated by reference herein in its entirety.

BACKGROUND OF THE INVENTION

1. Field of the Invention

The invention refers to the field of ceramics and relates to an assembled honeycomb, such as can be used, e.g., as a catalytic converter for cleaning exhaust gases, as catalyst substrate and/or as a filter, and as a heat exchanger and lightweight element.

2. Discussion of Background Information

Honeycombs of ceramic materials have been used for many years in environmental technology and the automotive industry for treating and cleaning exhaust gases. The honeycombs are commonly composed of a plurality of elongated channels with different cross-sectional shapes, which channels are separated from one another by thin ceramic webs. Honeycombs of this type are preferably shaped by extrusion (e.g., extrusion molding) of a plasticized ceramic mass through a die, then dried and fired (e.g., sintered). The shape of the channels and the outer shape of the honeycombs are established by the design of the extruder die. In principle, an endless strand is formed by extrusion. A honeycomb is then formed by cutting off vertically or at an angle to the direction of extrusion, which honeycomb has, e.g., prismatic outer contours; the base area of the prism (e.g., triangular, rectangular, square, hexagonal, etc.) is determined by the contours of the die, as stated above.

Depending on the choice of ceramic mass and the subsequent treatment steps, in terms of materials the honeycomb can be composed of different ceramic materials, e.g., aluminum oxide, Cordierite, mullite, titanium oxide, aluminum titanate, silicon carbide, silicon-silicon carbide, silicon nitride, aluminum nitride, carbon and various ceramets. It is also possible with this method to extrude and sinter masses of metallic powders and to therewith produce metallic honeycombs, e.g., of high-temperature-resistant alloys, such as Ni-based alloys or FeCrAl or FeCrAlY. The porosity of the materials can differ in quantity (e.g., pore volume), form and size. For applications as a catalytic converter, special catalyst materials are extruded, e.g., $TiO_2$ with $WO_3$ and $V_2O_5$, for the NOx reduction of flue gases and exhaust gases (e.g., so-called DeNOx catalytic converters) or hexaaluminates for high-temperature combustion. For applications as a catalyst substrate, the channel walls of the honeycombs are subsequently coated with washcoats to increase surface, in which washcoats catalytically active substances, e.g., noble metals such as Pt, are embedded.

For exhaust gas cleaning of, e.g., solvent-containing exhaust gases from paint shops, the honeycombs are coated with adsorbents, e.g., zeolites or with activated carbon. Lithium silicates, for example, can be used for the adsorption of $CO_2$ from combustion gases. The harmful constituents are removed from the exhaust gas and concentrated in the regeneration gas through alternating flow through with exhaust gas and with a gas for regeneration. Heat exchangers work in a similar manner, in which the honeycombs are first heated with a hot gas and subsequently, by switching over to a cold gas, the cold gas is heated up while flowing through.

In some applications, the channel walls of the honeycombs are made from a material with open, i.e., continuous porosity, and the channels are alternately closed several millimeters deep on both end faces such that each channel is closed on only one side and channels closed on one end face are adjacent to channels that are not closed (see, e.g., U.S. Pat. No. 4,329,162). In this manner a gas stream is forced to flow through the porous channel walls, whereby particles are filtered out of the exhaust gas stream and gaseous constituents are very effectively cleaned by the above-mentioned catalyst coatings. Honeycombs of this type have been used very successfully in recent years as diesel particulate filters.

In the above-mentioned technical applications monolithic honeycombs are rarely used for various reasons, instead several individual honeycombs are connected (by adhesion, sticking or clamping) to form an assembled honeycomb (see, e.g., U.S. Pat. No. 4,304,585) by joining to one another the lateral prism walls lying parallel to the flow direction. With respect to the assembled honeycomb, the individual honeycombs from which it is constructed are referred to below as honeycomb segments. These honeycomb segments are likewise composed of a plurality of elongated channels of different cross-sectional shapes that are separated from one another by thin ceramic webs. The individual channels of the different honeycomb segments lie parallel to one another in the connected honeycomb.

There are various reasons for assembling honeycombs instead of using monolithic structures. For example, to produce large honeycomb cross sections, a correspondingly large die and extruder cross section are necessary. This, however, is technically complex and causes great difficulties during burning (sintering) of the honeycombs, such that it is easier to instead assemble individual honeycomb segments after burning to form one large body.

Also, temperature gradients occur in the honeycomb with many technical applications, which, depending on the coefficient of expansion and thermal conductivity of the wall material, leads to thermomechanical stresses that can cause a distortion or the occurrence of cracks in the honeycomb. The relief of such stresses in a honeycomb is likewise achieved by using segmentations. If the honeycomb segments lie loosely against one another and are held only by their shape, e.g., by an external tensile force, each segment can expand and move virtually freely, so that the thermal stresses at the interface are completely relieved. However, it is often necessary to connect the individual segments to one another by adhesive force in order to achieve a higher overall strength of the assembled honeycomb or to ensure the joints are leak-proof with respect to the exhaust gas to be cleaned. This is achieved by gluing or sticking the honeycomb segments to the above-referenced prism walls, whereby the connecting layers should have a defined thickness and a lower modulus of elasticity than the material of the honeycomb segments. Moreover, the adhesive layers usually have a lower strength than the honeycomb segment material, so that in the event of excessive stresses, the adhesion joints are more likely to tear than the honeycomb segment material, so that the functionality of the assembled honeycomb is initially maintained.

It is understood that the geometry of the honeycomb segments influences the outer geometry of the assembled honeycomb. This, in turn, determines whether the body achieves the outer geometry required for the respective technical application, or whether the required outer geometry has to be produced by a laborious reworking procedure.

However, the size and geometry of the honeycomb segments also considerably influence properties that affect the production and application of the honeycombs. Thus, for example, the size and the outer shape of the honeycomb segments influence their mechanical strength depending on the load direction. With thermal load, the geometry of the honeycomb segments has a strong impact on the temperature distribution in the segments and in the assembled honeycomb, and on the mechanical stresses occurring due to the thermal expansion Through the combination of the honeycomb segments to form an assembled honeycomb, contact surfaces and contact edges are formed in the interior of the assembled honeycomb. Seam lines and contact points of the sides or corners of the cross sections of the individual segments result in the cross section of the assembled honeycomb perpendicular to the flow direction.

The geometry of the honeycomb segments thereby has a strong impact on the number, size and position of the contact areas and contact edges located in the interior of the assembled honeycomb. The geometric shape of the honeycomb segments therefore has a great impact on the mechanical stability of the assembled honeycomb which affects the processing and use of the honeycombs.

These segmentations are used to a large extent with diesel particulate filters of silicon carbide (e.g., European Pat. Appln. Nos. EP 0 816 065, EP 1 142 619). Typically, individual honeycomb segments with a square cross section (with rounded corners) are glued to one another to form a large block. Special gluing geometries and gluing materials are designed to achieve improved durability (e.g., European Pat. Appln. No. EP 1 291 061, and International Pub. Nos. WO 2005/084782, WO 2005/071234).

When honeycomb segments with square cross section are used, as described in European Pat. Appln. No. EP 1 508 356, in the cross section, 4 contact points are formed at the corners of the segments, which is relatively advantageous. The stability of the individual segments under mechanical stress perpendicular to the flow direction is relatively good and unfavorable only in the direction of the cross-sectional diagonal. Straight continuous seam lines running at a 90° angle to one another are necessary in such applications. A very high waste of at least 20% occurs in the production of round outer contour cross sections.

When honeycomb segments with the cross section of an equilateral triangle are used, as likewise described in EP 1 508 356, they have a very high strength under mechanical stress perpendicular to the flow direction, in particular under stress on the edges. The glued seams in the cross section of the assembled honeycomb perpendicular to the flow direction advantageously run at an angle of 60° to one another but form many straight continuous seam lines that are very unfavorable for the strength of the assembled honeycomb. It is particularly unfavorable in terms of strength that the segments in the interior of the assembled honeycomb meet at respectively 6 edges or in cross section at 6 corners. The cross section of the assembled honeycomb perpendicular to the flow direction can be designed as an equilateral hexagon or as an elongated hexagon, such that less waste occurs when producing round or oval outer-contour cross sections compared to the use of honeycomb segments with a square cross section.

When honeycomb segments are used with the cross section of an equilateral regular hexagon, as likewise described in EP 1 508 356, they have a low strength under mechanical stress perpendicular to the flow direction, in particular under stress on the edges. The glued seams in the cross section of the assembled honeycomb perpendicular to the flow direction advantageously run at an angle of 120° to one another and do not form straight continuous seam lines that are unfavorable for the strength of the assembled honeycombs. It is also advantageous for strength that only 3 segments meet at the edges or in cross section at 3 corners. However, it is very unfavorable that the outer cross section of the assembled honeycomb has many concave outer contours. Due to this, the assembled honeycombs cannot be sealed and installed without processing, and a high degree of waste occurs in the production of round or oval outer-contour cross sections.

With other conventional assembled honeycombs, the honeycomb segments have a circle-segment cross section, so that honeycombs with round cross-sectional geometries can be produced from these segments without reworking. However, with a high number of segmentations and large cross-section diameters of the honeycombs, the segments have a very elongated and acute-angled cross-sectional geometry, which is unfavorable for the strength of the individual segments. Moreover, the edges of all of the segments meet in the interior of the honeycomb at one point, which is unfavorable for the strength of the honeycomb. Therefore, with large cross-sectional diameters of assembled honeycombs, a centric honeycomb with a round cross section is used and around it several satellite honeycomb segments surrounding it are attached, which segments in cross section have the shape of annular segments. However, at least two different segment shapes are necessary for this and the mechanical stability of the concave side of the satellite honeycomb segments is unfavorable.

SUMMARY OF THE INVENTION

The present invention provides an assembled honeycomb that is assembled from honeycomb segments with simple cross-sectional shapes with only few variations, has great strength under exterior stress perpendicular to the flow direction and with non-uniform thermal stress, and the individual segments of which have a high strength under mechanical or thermomechanical stress perpendicular to the flow direction.

The assembled honeycomb according to aspects of the invention can be used as a filter for cleaning exhaust gases generated by diesel engines in motor vehicles, construction machinery, locomotives, marine engines or stationary emergency power-generating sets.

The assembled honeycombs according to aspects of the invention are composed of at least two prismatic honeycomb segments, whereby the outer cross section of a honeycomb segment perpendicular to the flow direction is a quadrangle with included angles of 60° and 120° or of 60° and 90° and 120°, with deviations in the angular degrees of respectively no more than 3°. At least respectively one outer lateral surface of the prismatic honeycomb segments are in contact with one another or connected to one another by adhesive force largely over their entire length and parallel to the flow direction in the interior of the assembled honeycomb. In the cross section of the assembled honeycomb, the corners of the outer cross section of prismatic honeycomb segments meet or are connected to one another by adhesive force as an extension of their sides at least at two but no more than five points. The assembled honeycomb as a whole has a convex outer geometry with an outer cross section that is convex overall.

Advantageously, all the prismatic honeycomb segments used may have the same outer cross section.

The prismatic honeycomb segments may have an outer cross section of a quadrangle with two included angles lying opposite one another of respectively 60° and with the other two included angles lying opposite one another of respectively 120°.

Moreover, the prismatic honeycomb segments may have an outer cross section of a quadrangle with two included angles lying next to one another of respectively 60° and with the other two included angles lying next to one another of respectively 120°.

In embodiments, the prismatic honeycomb segments have an outer cross section of a quadrangle with two included angles lying next to one another of respectively 90° and with two included angles of 120° and 60° lying opposite these two angles.

The prismatic honeycomb segments may have an outer cross section of an equilateral parallelogram or a trapezoid with a base a that is double the length of the other 3 sides, or of a trapezoid with a base a that is double the length of the opposite side c.

In embodiments, the corners of the outer cross section of the prismatic honeycomb segments are rounded, where the radii of the corners of the outer cross section can be advantageously 1 to 5 mm.

In further embodiments, the cross section of the interior of the prismatic honeycomb segments is different from the outer cross section of the prismatic honeycomb segments.

According to additional aspects of the invention, the cross section of the interior of the prismatic honeycomb segments is round, rectangular, square, triangular, hexagonal and/or has a wavy structure.

The cross section of the interior of all of the prismatic honeycomb segments of the honeycomb may be at least one of: the same and of equal size.

In exemplary implementations, the cross section of the interior of the prismatic honeycomb segments of the honeycomb is at least one of: different and of different sizes.

In embodiments, the cross section of the interior of the prismatic honeycomb segments of the honeycomb is at least one of: alternately different and of different sizes.

In further embodiments, the cross section of the interior of the prismatic honeycomb segments of the honeycomb is triangular and of the same size.

According to further advantageous aspects of the invention, the interior of the prismatic honeycomb segments is subdivided by webs, whereby the webs can be arranged in at least one of the following arrangements: in regular geometric patterns over the cross section in the interior of the prismatic honeycomb segments; the webs running over the entire length of the honeycomb segments in the interior of the honeycomb segments; and the webs in the interior of the honeycomb segments forming channels over the entire length of the honeycomb segments, which channels can have at least one of a triangular, square, and rectangular cross section. Additionally or alternatively, the channels in the interior of the honeycomb segments formed by the webs can be alternately closed at their ends. In the honeycomb segment channels can be arranged next to one another, in which the closed end is respectively arranged at the other end of the honeycomb, so that an alternating closure of the ends of the channels lying next to one another of the honeycomb segment can be present at one end of the honeycomb.

In particular embodiments, the convex outer cross section of the entire honeycomb is a symmetrical or elongated hexagon or a rectangle. Honeycomb segments with an outer cross section of a quadrangle with two included angles lying next to one another of respectively 90° and with two included angles of 120° and 60° lying opposite these two angles may be used to achieve a rectangular outer cross section of the entire honeycomb.

In implementations of the invention, at least the outer wall of the honeycomb segments has a rough surface structure. For example, at least one of the following arrangements may be provided: the outer wall of the honeycomb segments has a rougher surface than the inner wall of the honeycomb segments; the outer wall of the honeycomb segments has fixing grooves over the length of the honeycomb segments; and only the areas of contact of the honeycomb segments have surface structures.

The outer lateral surfaces of the honeycomb segments that are connected to one another by adhesive force may be connected to one another by adhesive force by a glue.

The honeycomb segments may be composed entirely or in part of ceramic and/or metallic materials comprising: $Al_2O_3$, Cordierite, mullite, titanium oxide, aluminum titanate, silicon carbide, silicon-silicon carbide, silicon nitride, aluminum nitride or mixtures of these ceramics or cermets thereof or sintered steel.

In embodiments, the glue is composed of inorganic constituents and a ceramic filler and a binder. Ceramic powders or ceramic powders and ceramic fibers are present as ceramic fillers. Additionally or alternatively, the ceramic powder is the same material that forms the walls of the honeycomb segments. Additionally or alternatively, hydraulic binders are used as a binder, such as, at least one of: Ca-aluminates, aluminum phosphates, sodium silicates (water glass), silica sols and hardening resins.

In particular embodiments, the entire surface of one or more honeycomb segments or parts thereof is coated with catalyst material of at least one of: noble metals, doped titanium oxides, and zeolites.

The entire surface of one or more honeycomb segments or parts thereof may be coated with adsorbents of at least one of: activated carbon, zeolites, and lithium silicates.

According to further aspects of the invention, the convex outer contour of the honeycomb is treated mechanically and/or chemically after the assembly of the honeycomb to change the outer cross section of the honeycomb, such that a round or oval outer cross section of the assembled honeycomb is present.

In embodiments, the assembled honeycomb is at least one of mechanically braced and covered.

With the assembled honeycomb in accordance with aspects of the invention, a component part is available which can be produced simply and cost-effectively by the use of only one cross-sectional shape of honeycomb segments. A high strength under external stress and non-uniform thermal load is thus likewise achieved.

In embodiments, through the assembly of the honeycomb from several individual honeycomb segments, a complete surface coverage of the cross-sectional surface of the honeycomb (and in volume, also) over its entire length is possible. The coverage is interrupted only by the thin adhesive layers, i.e., no undesirable voids occur between the honeycomb segments in the volume of the assembled honeycomb.

Furthermore, in embodiments, the interior of one individual, several, or all of the honeycomb segments can also be subdivided by webs. The interior as used herein refers to the space that is enclosed by the four lateral walls of a honeycomb segment. The geometrical shape of the interior of the honeycomb segments will often exhibit the same geometric shape of the outer cross section of the honeycomb segments due to manufacture, but can also have a geometric shape deviating therefrom. The webs that subdivide the volume of the interior may be composed of the same material as the honeycomb segment walls. In embodiments, the webs are arranged uniformly distributed over the cross section as well as over the length of the honeycomb segments over the entire interior. The segments can surround a space that has the same geometric shape as that of the outer cross section of the honeycomb, the same shape as the interior of the honeycomb, or different shapes. When the interior of the honeycomb segments, e.g., in the corners, is embodied in a rounded manner, triangular shapes can be used as deviating geometric shapes, or those that at least in part have curved sides.

Furthermore, for cost reasons and reasons of production logistics, it is desirable to use only one cross-sectional shape or only a small number of different cross-sectional shapes. This is possible through implementations of the invention. Moreover, according to aspects of the invention, the individual honeycomb segments can have an identical or a similar outer cross-sectional area and thus approximately the same volume, whereby the thermal stresses can be kept approximately the same in all of the segments.

In embodiments, the geometric size and length of the honeycomb segments and of the assembled honeycomb depends on the respective use as well as on business management considerations, and can be determined through calculations or by tests.

A specific, usually predetermined, outer contour can be achieved with the assembled honeycombs according to aspects of the invention. The honeycombs can be installed in technical peripheral equipment and are there protected from or can be sealed from mechanical stresses, e.g., shocks and vibrations, in order to avoid edge flow effects of the exhaust gas to be treated. With diesel particulate filters and catalyst substrates of the automotive field, this is referred to as canning, in which the (assembled) honeycombs are provided with a metallic cover on the outer casing parallel to the flow direction. To this end, in implementations of the invention, the outer casing surface of the assembled honeycomb lying parallel to the flow direction is wrapped with a bearing and sealing mat and provided with a metal casing. The two end faces of the honeycomb located perpendicular to the flow direction thereby remain free, in order to guarantee the exhaust gas can enter and exit. Mechanical stresses of the assembled honeycomb also occur during packing (e.g., canning), in particular compressive stresses perpendicular to the flow direction of the honeycomb. Accordingly, in embodiments, the assembled honeycombs have a convex structure, i.e., curved outwards, in the outer cross section perpendicular to the flow direction, since concave areas in the outer contour are difficult to seal and have only low strength. Round or oval outer cross sections of the assembled honeycomb perpendicular to the flow direction are particularly preferred, since they can be well sealed and the forces occurring are uniformly distributed.

It is disadvantageous for the strength of an assembled honeycomb if the connection points of the individual honeycomb segments in the cross section perpendicular to the flow direction (i.e., the seam lines) form many longer continuous straight lines. Accordingly, the lower strength of the connection points is disadvantageous and a complete tear of the assembled honeycomb can occur at the joints with a load from external or internal mechanical stresses.

It is likewise disadvantageous in terms of strength if very many edges of individual segment cross sections meet when several segments meet in the interior of the cross section of the assembled honeycomb perpendicular to the flow direction. The low strength of the joints here has a disadvantageous effect.

As used herein, the corners and edges meet when at least one of: one or more corners and edges of the individual honeycomb segments are in contact, and the webs in the interior of the honeycomb segments are among one another. In the case of rounded corners and edges, the meeting of these corners and edges refers to the extensions of their lateral surfaces or lines meeting at one point.

The above-noted disadvantages are overcome with the honeycomb according to aspects of the invention.

Filters free of gaps can be assembled from the prismatic honeycomb segments according to the invention with a rectangular outer cross section using segments with only one cross-sectional shape.

Low reworking is likewise possible with embodiments of the invention. An extensive filling of a round or oval outer cross section of the assembled honeycomb can be achieved due to the selected outer cross sections of the honeycomb segments and their arrangement with respect to one another.

In any case, less waste occurs through a reworking of an assembled honeycomb according to aspects of the invention than with the customary production from honeycomb segments with a square cross section.

In embodiments, elongated hexagonal or rectangular outer cross sections of the assembled honeycomb are possible, which can then be processed to form an oval outer cross section.

Furthermore, according to additional aspects of the invention, the surface of the outer walls of the honeycomb segments can be smooth or provided with special surface structure/roughness, with fixing grooves or with a coating, which can be the same on all of the surfaces or different on each side of the honeycomb segments.

In particular embodiments, at least the surfaces that come into contact with the medium are coated with, e.g., a catalyst bed.

According to aspects of the invention, there is an assembled honeycomb structure, comprising at least two prismatic honeycomb segments. An outer cross section of each of the at least two prismatic honeycomb segments perpendicular to a flow direction in an interior of the assembled honeycomb structure is a quadrangle with included angles of one of: (i) about 60° and about 120°, or (ii) about 60°, about 90° and about 120°.

In embodiments, deviations in angular degrees of the respective included angles are no more than 3°. Moreover, at least one outer lateral surfaces of each of the at least two prismatic honeycomb segments may be at least one of: in contact with one another, and connected by an adhesive force over their entire length and parallel to the flow direction. Also, in a cross section of the assembled honeycomb structure, outer cross sections of the at least two prismatic honeycomb segments perpendicular to the flow direction include corners arranged to meet or to be connected together by an adhesive force as an extension of their sides at least at two but not more than five points. Furthermore, the assembled honeycomb structure may have a convex outer geometry with a convex outer cross section.

According to a particular aspect of the invention, all of the at least two prismatic honeycomb segments have a same outer cross section. In embodiments, the at least two prismatic honeycomb segments have an outer cross section of a quadrangle with first and second included angles of 60° arranged diagonally opposite one another, and third and fourth included angles of 120° arranged diagonally opposite one another. Alternatively, the at least two prismatic honeycomb segments have an outer cross section of a quadrangle with first and second included angles of 60° arranged next one another, and third and fourth included angles of 120° arranged next one another. Alternatively, the at least two prismatic honeycomb segments have an outer cross section of a quadrangle with first and second included angles of 90° arranged next one another, and a third included angle of 120° arranged diagonally opposite the first included angle, and a fourth included angle of 60° arranged diagonally opposite the second included angle.

According to further aspects of the invention, the at least two prismatic honeycomb segments have outer cross sections of at least one of: an equilateral parallelogram, a trapezoid with a base having a base length that is double a length of each of the other sides of the trapezoid, and a trapezoid with a base having a base length that is double a length of a side arranged opposite to the base.

Corners of outer cross sections of the at least two prismatic honeycomb segments may be rounded. Also, radii of the corners may be in a range of 1 to 5 mm.

In embodiments, a cross section of an interior of the at least two prismatic honeycomb segments is different from an outer cross section of the at least two prismatic honeycomb segments. In further embodiments, a cross section of an interior of the at least two prismatic honeycomb segments is round, rectangular, square, triangular, hexagonal or has a wavy structure. In even further embodiments, respective cross sections of interiors of all of the at least two prismatic honeycomb segments in the assembled honeycomb structure are at least one of: identical shape and equal size. In still further embodiments, respective cross sections of interiors of the at least two prismatic honeycomb segments are at least one of: different shape and different size. In yet further embodiments, respective cross sections of interiors of the at least two prismatic honeycomb segments are at least one of: alternately different shape and different size. In even further embodiments, respective cross sections of interiors of the at least two prismatic honeycomb segments are triangular and a same size.

According to additional aspects of the invention, interiors of the at least two prismatic honeycomb segments are subdivided by webs. The webs may be arranged in regular geometric patterns over a cross section in the interiors. The webs may be arranged over an entire length of the at least two prismatic honeycomb segments in the interiors. The webs may form channels over an entire length of the at least two prismatic honeycomb segments in the interiors. The channels may have at least one of a triangular, square, and rectangular cross section. In embodiments, each of the channels is closed at one end, and for each two of the channels arranged next to one another, a first of the two channels is closed at a first end of the assembled honeycomb structure and a second of the two channels is closed at a second end of the assembled honeycomb structure opposite the first end.

According to further aspects of the invention, the convex outer cross section of the assembled honeycomb structure is a symmetrical or elongated hexagon or a rectangle. In embodiments, the at least two prismatic honeycomb segments have outer cross sections of a quadrangle with first and second included angles of 90° arranged next to one another, a third included angle 120° arranged diagonally opposite the first included angle, and a fourth included angle of 60° arranged diagonally opposite the second included angle, and the convex outer cross section of the assembled honeycomb structure is rectangular.

According to additional aspects of the invention, an outer wall of the at least two prismatic honeycomb segments comprises a rough surface structure. The outer wall of the at least two prismatic honeycomb segments may comprise a rougher surface than an inner wall of the at least two prismatic honeycomb segments. The outer wall of the at least two prismatic honeycomb segments may comprise fixing grooves over a length of the at least two prismatic honeycomb segments. In embodiments, only contacting surfaces of respective ones of the at least two prismatic honeycomb segments have surface structures.

In implementations of the invention, the at least two prismatic honeycomb segments are composed entirely or in part of at least one of: ceramic and metallic materials. The at least two prismatic honeycomb segments may be composed of at least one of: $Al_2O_3$, Cordierite, mullite, titanium oxide, aluminum titanate, silicon carbide, silicon-silicon carbide, silicon nitride, aluminum nitride, or of mixtures of these ceramics, or of cermets thereof. The at least two prismatic honeycomb segments may be composed of sintered steel.

In embodiments of the invention, the respective outer lateral surfaces of the at least two prismatic honeycomb segments may be adhered to one another by a glue. The glue may be composed of inorganic constituents and a ceramic filler and a binder. The ceramic filler may comprise: ceramic powder, or ceramic powder and ceramic fibers. The ceramic powder may be a same material that forms walls of the at least two prismatic honeycomb segments. The binder may comprise hydraulic binders. The binder may comprise at least one of: Ca-aluminates, aluminum phosphates, sodium silicates (water glass), silica sols, and hardening resins.

According to aspects of the invention, an entire surface of at least one of the at least two prismatic honeycomb segments, or parts thereof, is coated with catalyst material comprising at least one of: noble metals, doped titanium oxides, and zeolites. According to additional aspects of the invention, an entire surface of at least one of the at least two prismatic honeycomb segments, or parts thereof, is coated with adsorbents comprising at least one of: activated carbon, zeolites, and lithium silicates.

In embodiments of the invention, a first convex outer cross section of the assembled honeycomb structure is treated at least one of mechanically and chemically after assembly of the assembled honeycomb structure to produce a second outer cross section of the assembled honeycomb structure different from the first. The second outer cross section of the assembled honeycomb structure may comprise a round or oval outer cross section.

According to further aspects of the invention, the assembled honeycomb is at least one of mechanically braced and covered.

BRIEF DESCRIPTION OF THE DRAWINGS

The invention is explained in greater detail below based on exemplary embodiments with reference to the accompanying drawings, in which:

FIGS. 1A-1H show outer cross sections of the honeycomb segments according to aspects of the invention;

FIGS. 2A-2F show outer cross sections of the unprocessed assembled honeycombs according to aspects of the invention;

DETAILED DESCRIPTION OF THE INVENTION

FIGS. 1A-1H show outer cross sections of the honeycomb segments according to aspects of the invention. FIG. 1A shows the outer cross section of a honeycomb segment that is embodied as a quadrangle with two included angles lying next to one another of respectively 60° and 120°.

FIG. 1B shows the outer cross section of a honeycomb segment as in FIG. 1A, in which the cross section assumes the shape of a trapezoid with a base a, which has double the length of the other three sides c.

FIG. 1C shows the outer cross section of a honeycomb segment that is embodied as a quadrangle with two included angles lying opposite one another of respectively 60° and with the other two included angles lying opposite one another of respectively 120°.

FIG. 1D shows the outer cross section of a honeycomb segment as in FIG. 1C, with which the cross section has the shape of an equilateral parallelogram (rhombus).

FIG. 1E shows the outer cross section of a honeycomb segment that is embodied as a quadrangle with included angles of 60°, 90° and 120°.

FIG. 1F shows the outer cross section of a honeycomb segment as in FIG. 1E, in which the cross section assumes the shape of a trapezoid with a base a, which has double the length of the side c lying opposite.

FIG. 1G shows a prismatic honeycomb segment with a cross section according to FIG. 1A.

FIG. 1H shows a prismatic honeycomb segment according to FIG. 1G with rounded longitudinal edges.

FIGS. 2A-2F show outer cross sections of the unprocessed assembled honeycombs according to aspects of the invention.

FIG. 2A shows the cross section of a honeycomb assembled from 2 honeycomb segments according to FIGS. 1A and 2 honeycomb segments according to FIG. 1C.

FIG. 2B shows the cross section of a honeycomb assembled from 8 honeycomb segments according to FIG. 1B.

FIG. 2C shows the cross section of a honeycomb assembled from 12 honeycomb segments according to FIG. 1D.

FIG. 2D shows the cross section of a honeycomb assembled from 24 honeycomb segments according to FIG. 1F.

FIG. 2E shows the cross section of a honeycomb assembled from 36 honeycomb segments according to FIG. 1F.

FIG. 2F shows a honeycomb assembled from 8 prismatic honeycomb segments with cross sections according to FIG. 1B.

Figure 3:
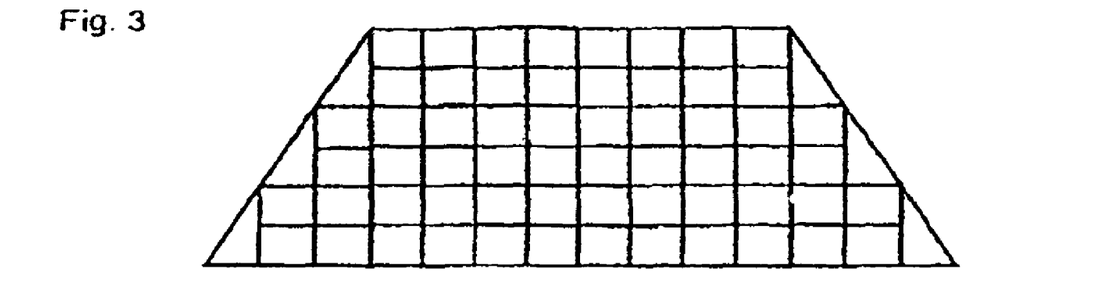
FIG. 3 shows a honeycomb structure of a honeycomb segment according to FIG. 1A shown diagrammatically in cross section.

FIG. 3 shows a honeycomb structure of a honeycomb segment according to FIG. 1A shown diagrammatically in cross section.

Figure 4:
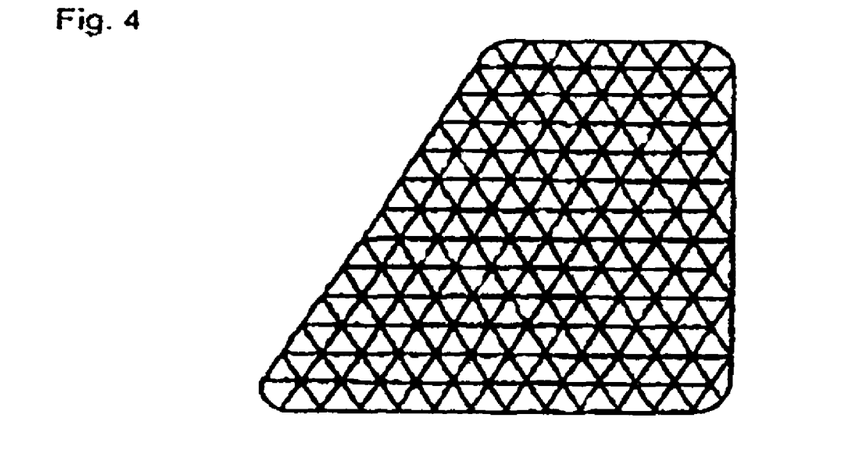
FIG. 4 shows a honeycomb structure of a honeycomb segment according to FIG. 1F with rounded corners shown diagrammatically in cross section.

FIG. 4 shows a honeycomb structure of a honeycomb segment according to FIG. 1F with rounded corners shown diagrammatically in cross section.

Figure 5:
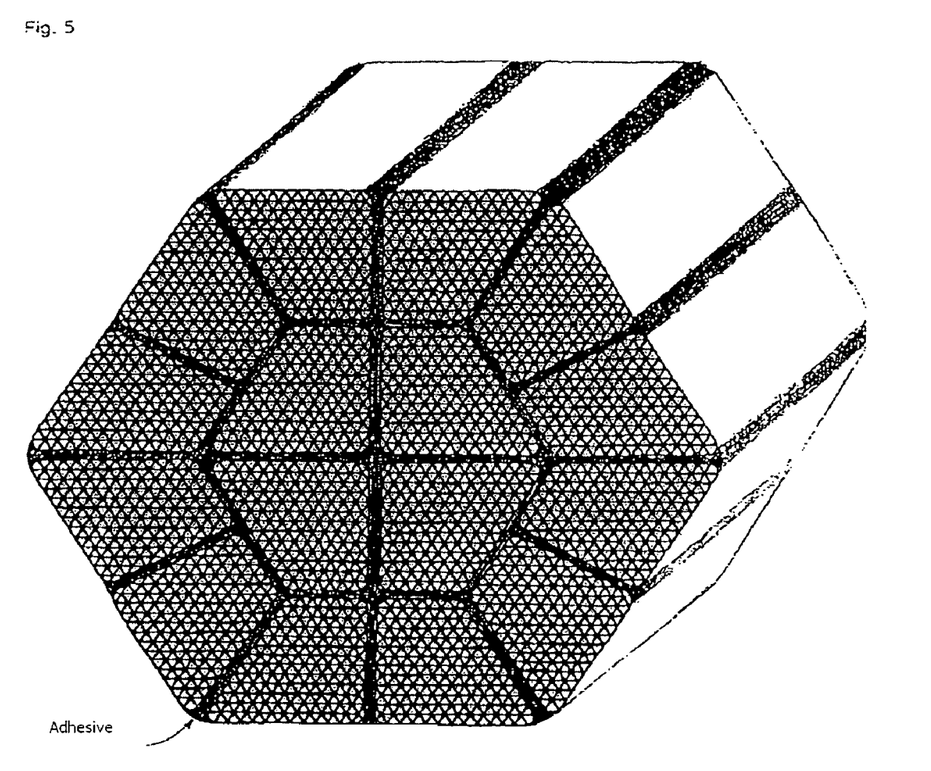
FIG. 5 shows a honeycomb assembled from 16 prismatic honeycomb segments with cross sections according to FIG. 1F with rounded edges, honeycomb structure and adhesive seams.

FIG. 5 shows a honeycomb assembled from 16 prismatic honeycomb segments with cross sections according to FIG. 1F with rounded edges, honeycomb structure and adhesive seams.

In exemplary embodiments of the invention, 73.5% of a silicon carbide powder with an average grain size of 30 μm is mixed and kneaded with 1% aluminum oxide and 0.5% yttrium oxide, 7% methyl cellulose as a binder, 3% plasticizer, 1% lubricant and 14% water. The mass is pressed with a screw-type extruder through a honeycomb die to form prismatic strands that have an outer cross section according to FIG. 1F. The length of side c is 34.5 mm. The outer corners are rounded with a radius of 2.6 mm at the 120° and 90° corners and with a radius of 1.9 mm at the 60° corner. The honeycomb die has a structure such that an inner structure and an outer cross section according to FIG. 4 are formed in cross section perpendicular to the longitudinal axis of the prismatic strands, the wall thickness of the webs being approx. 350 μm.

In accordance with aspects of the invention, the prismatic strand is cut with a knife to individual prismatic honeycomb segments of approximately 250 mm length, and the segments are subsequently dried in dry molds for two days at 40° C. Then the honeycomb segments at both end faces of the prism are cut with a diamond saw perpendicular to the longitudinal axis to a precise measurement of 230 mm length.

In embodiments, 73.5% of a silicon carbide powder with an average grain size of 30 μm is mixed with 1% aluminum oxide and 0.5% yttrium oxide, 3% methyl cellulose and 22% water and the resulting mass is inserted alternately approximately 5 mm deep into the honeycomb channels by a tubule from the end faces such that one channel on one end face is always alternately closed and remains free on the opposite side, and on one end face a closed channel is always adjacent to an open channel.

According to further exemplary aspects of the invention, honeycomb segments are sintered in a protective atmosphere furnace in an argon atmosphere at 1950° with 2 hours dwell time.

In particular embodiments, 30% of a silicon carbide powder with an average grain size of 5 μm is mixed with 25% aluminum silicate short fibers, 15% silica sol (30%) and 30% water to form a ceramic adhesive. The adhesive mass is applied thinly to the lateral prism surfaces of 36 sintered honeycomb segments, and these are arranged such that an arrangement according to FIG. 2E results in the cross section. Adhesive gaps result between the segments, which gaps are 1.8 mm thick in cross section. After adhesion, the honeycomb is placed in a drying mold and dried for 2 days at 120° C.

In implementations of the invention, the adhesive seams do not produce straight continuous lines in cross section, and the corners of the honeycomb segments produce common adhesive points at 2, 3, 4 or 5 points.

In embodiments, the assembled honeycomb has the shape of a right-angled prism, the base area of which forms a regular hexagon. The distance between the sides of the hexagon lying opposite one another is approximately 250 mm and the length of the prism 230 mm. The honeycomb can be installed in a cylindrical metal housing without waste and used as a diesel particulate filter for a construction machine.

The invention claimed is:

1. An assembled honeycomb structure, comprising:
   at least two prismatic honeycomb segments,
   wherein an outer cross section of each of the at least two prismatic honeycomb segments perpendicular to a flow direction in an interior of the assembled honeycomb structure is a quadrangle with included angles of at least about 60° and about 120°.

2. The assembled honeycomb structure according to claim 1, wherein all of the at least two prismatic honeycomb segments have a same outer cross section.

3. The assembled honeycomb structure according to claim 1, wherein the at least two prismatic honeycomb segments have an outer cross section of a quadrangle with first and second included angles of 60° arranged diagonally opposite one another, and third and fourth included angles of 120° arranged diagonally opposite one another.

4. The assembled honeycomb structure according to claim 1, wherein the at least two prismatic honeycomb segments have an outer cross section of a quadrangle with first and second included angles of 60° arranged next one another, and third and fourth included angles of 120° arranged next one another.

5. The assembled honeycomb structure according to claim 1, wherein the at least two prismatic honeycomb segments have outer cross sections of at least one of:
an equilateral parallelogram,
a trapezoid with a base having a base length that is double a length of each of the other sides of the trapezoid, and
a trapezoid with a base having a base length that is double a length of a side arranged opposite to the base.

6. The assembled honeycomb structure according to claim 1, wherein corners of outer cross sections of the at least two prismatic honeycomb segments are rounded.

7. The assembled honeycomb structure according to claim 6, wherein radii of the corners are in a range of 1 to 5 mm.

8. The assembled honeycomb structure according to claim 1, wherein a cross section of an interior of the at least two prismatic honeycomb segments is different from an outer cross section of the at least two prismatic honeycomb segments.

9. The assembled honeycomb structure according to claim 1, wherein a cross section of an interior of the at least two prismatic honeycomb segments is round, rectangular, square, triangular, hexagonal or has a wavy structure.

10. The assembled honeycomb structure according to claim 1, wherein respective cross sections of interiors of all of the at least two prismatic honeycomb segments in the assembled honeycomb structure are at least one of: identical shape and equal size.

11. The assembled honeycomb structure according to claim 1, wherein respective cross sections of interiors of the at least two prismatic honeycomb segments are at least one of: different shape and different size.

12. The assembled honeycomb structure according to claim 1, wherein respective cross sections of interiors of the at least two prismatic honeycomb segments are at least one of: alternately different shape and different size.

13. The assembled honeycomb structure according to claim 1, wherein respective cross sections of interiors of the at least two prismatic honeycomb segments are triangular and a same size.

14. The assembled honeycomb structure according to claim 1, wherein interiors of the at least two prismatic honeycomb segments are subdivided by webs.

15. The assembled honeycomb structure according to claim 14, wherein the webs are arranged in regular geometric patterns over a cross section in the interiors.

16. The assembled honeycomb structure according to claim 14, wherein the webs are arranged over an entire length of the at least two prismatic honeycomb segments in the interiors.

17. The assembled honeycomb structure according to claim 14, wherein the webs form channels over an entire length of the at least two prismatic honeycomb segments in the interiors.

18. The assembled honeycomb structure according to claim 17, wherein the channels have at least one of a triangular, square, and rectangular cross section.

19. The assembled honeycomb structure according to claim 17, wherein:
each of the channels is closed at one end, and
for each two of the channels arranged next to one another, a first of the two channels is closed at a first end of the assembled honeycomb structure and a second of the two channels is closed at a second end of the assembled honeycomb structure opposite the first end.

20. The assembled honeycomb structure according to claim 1, wherein an outer wall of the at least two prismatic honeycomb segments comprises a rough surface structure.

21. The assembled honeycomb structure according to claim 20, wherein the outer wall of the at least two prismatic honeycomb segments comprises a rougher surface than an inner wall of the at least two prismatic honeycomb segments.

22. The assembled honeycomb structure according to claim 20, wherein the outer wall of the at least two prismatic honeycomb segments comprises fixing grooves over a length of the at least two prismatic honeycomb segments.

23. The assembled honeycomb structure according to claim 20, wherein only contacting surfaces of respective ones of the at least two prismatic honeycomb segments have surface structures.

24. The assembled honeycomb structure according to claim 1, wherein the at least two prismatic honeycomb segments are composed entirely or in part of at least one of: ceramic and metallic materials.

25. The assembled honeycomb structure according to claim 24, wherein the at least two prismatic honeycomb segments are composed of at least one of: $Al_2O_3$, Cordierite, mullite, titanium oxide, aluminum titanate, silicon carbide, silicon-silicon carbide, silicon nitride, aluminum nitride, or of mixtures of these ceramics, or of ceramets thereof.

26. The assembled honeycomb structure according to claim 24, wherein the at least two prismatic honeycomb segments are composed of sintered steel.

27. The assembled honeycomb structure according to claim 1, wherein an entire surface of at least one of the at least two prismatic honeycomb segments, or parts thereof, is coated with catalyst material comprising at least one of: noble metals, doped titanium oxides, and zeolites.

28. The assembled honeycomb structure according to claim 1, wherein an entire surface of at least one of the at least two prismatic honeycomb segments, or parts thereof, is coated with adsorbents comprising at least one of: activated carbon, zeolites, and lithium silicates.

29. The assembled honeycomb structure according to claim 1, wherein a first convex outer cross section of the assembled honeycomb structure is treated at least one of mechanically and chemically after assembly of the assembled honeycomb structure to produce a second outer cross section of the assembled honeycomb structure different from the first.

30. The assembled honeycomb structure according to claim 29, wherein the second outer cross section of the assembled honeycomb structure comprises a round or oval outer cross section.

31. The assembled honeycomb structure according to claim 1, wherein the assembled honeycomb is at least one of mechanically braced and covered.

32. An assembled honeycomb structure, comprising:
at least two prismatic honeycomb segments,
wherein an outer cross section of each of the at least two prismatic honeycomb segments perpendicular to a flow direction in an interior of the assembled honeycomb structure is a quadrangle with included angles of one of: (i) 60° and 120°, or (ii) 60°, 90° and 120°,
wherein deviations in angular degrees of the respective included angles are no more than 3°.

33. The assembled honeycomb structure according to claim 32, wherein at least one outer lateral surfaces of each of the at least two prismatic honeycomb segments are at least one of: in contact with one another, and connected by an adhesive force over their entire length and parallel to the flow direction.

34. The assembled honeycomb structure according to claim 33, wherein in a cross section of the assembled honeycomb structure, outer cross sections of the at least two prismatic honeycomb segments perpendicular to the flow direction include corners arranged to meet or to be connected together by an adhesive force as an extension of their sides at least at two but not more than five points.

35. The assembled honeycomb structure according to claim 34, wherein the assembled honeycomb structure has a convex outer geometry with a convex outer cross section.

36. The assembled honeycomb structure according to claim 35, wherein the convex outer cross section of the assembled honeycomb structure is a symmetrical or elongated hexagon or a rectangle.

37. The assembled honeycomb structure according to claim 36, wherein:
the at least two prismatic honeycomb segments have outer cross sections of a quadrangle with first and second included angles of 90° arranged next to one another, a third included angle 120° arranged diagonally opposite the first included angle, and a fourth included angle of 60° arranged diagonally opposite the second included angle, and
the convex outer cross section of the assembled honeycomb structure is rectangular.

38. The assembled honeycomb structure according to claim 32, wherein the at least two prismatic honeycomb segments have an outer cross section of a quadrangle with first and second included angles of 90° arranged next one another, and a third included angle of 120° arranged diagonally opposite the first included angle, and a fourth included angle of 60° arranged diagonally opposite the second included angle.

39. The assembled honeycomb structure according to claim 33, wherein the respective outer lateral surfaces of the at least two prismatic honeycomb segments are adhered to one another by a glue.

40. The assembled honeycomb structure according to claim 39, wherein the glue is composed of inorganic constituents and a ceramic filler and a binder.

41. The assembled honeycomb structure according to claim 40, wherein the ceramic filler comprises: ceramic powder, or ceramic powder and ceramic fibers.

42. The assembled honeycomb structure according to claim 41, wherein the ceramic powder is a same material that forms walls of the at least two prismatic honeycomb segments.

43. The assembled honeycomb structure according to claim 40, wherein the binder comprises hydraulic binders.

44. The assembled honeycomb structure according to claim 40, wherein the binder comprises at least one of: Ca-aluminates, aluminum phosphates, sodium silicates (water glass), silica sols, and hardening resins.

* * * * *